June 8, 1965  W. G. HARRISON ETAL  3,187,878
ARTICLE HANDLING APPARATUS
Filed April 10, 1962  6 Sheets-Sheet 1
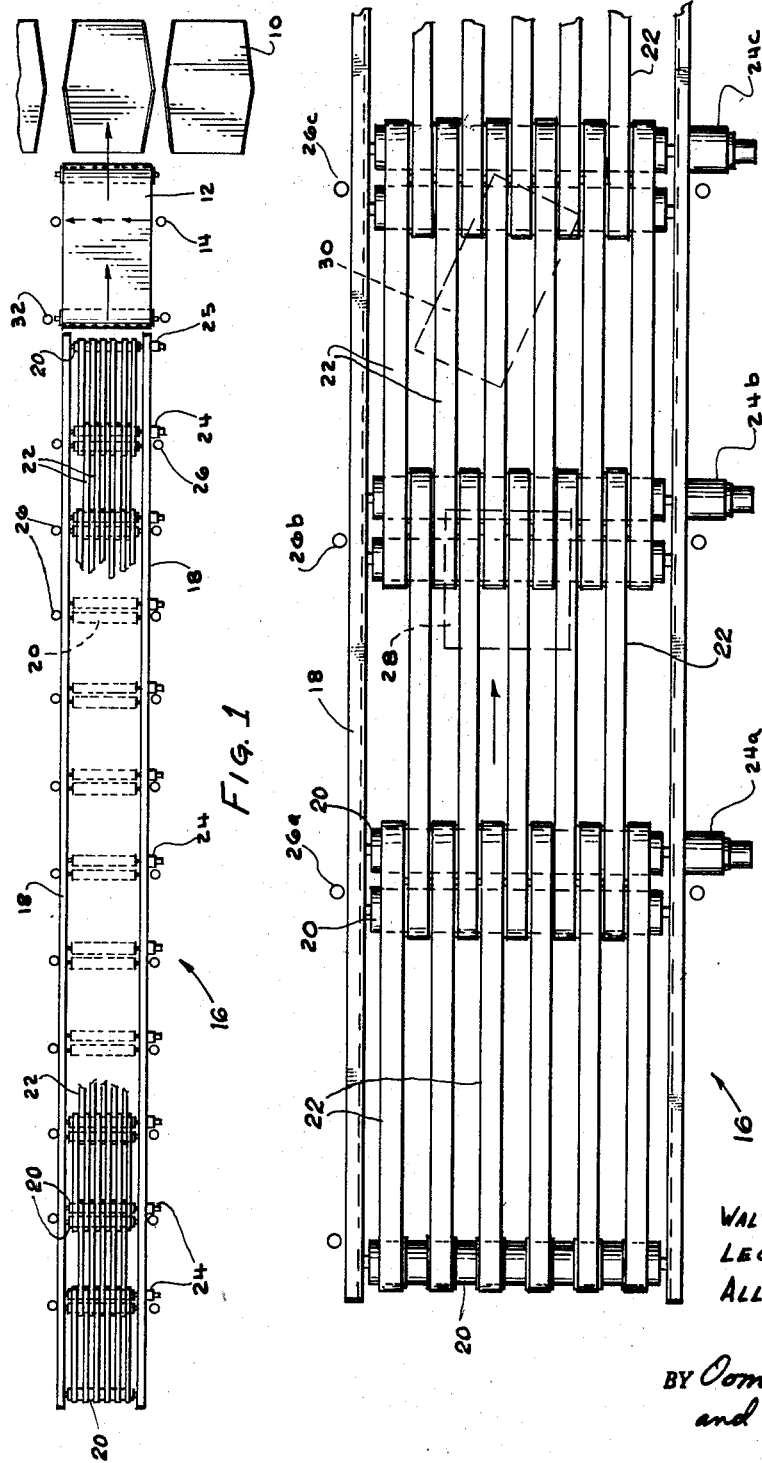
WALTER G. HARRISON
LEO A. GARY
ALLAN C. AUDET
      INVENTORS
BY Oomo, McDougall
and Hersh
         ATT'YS.

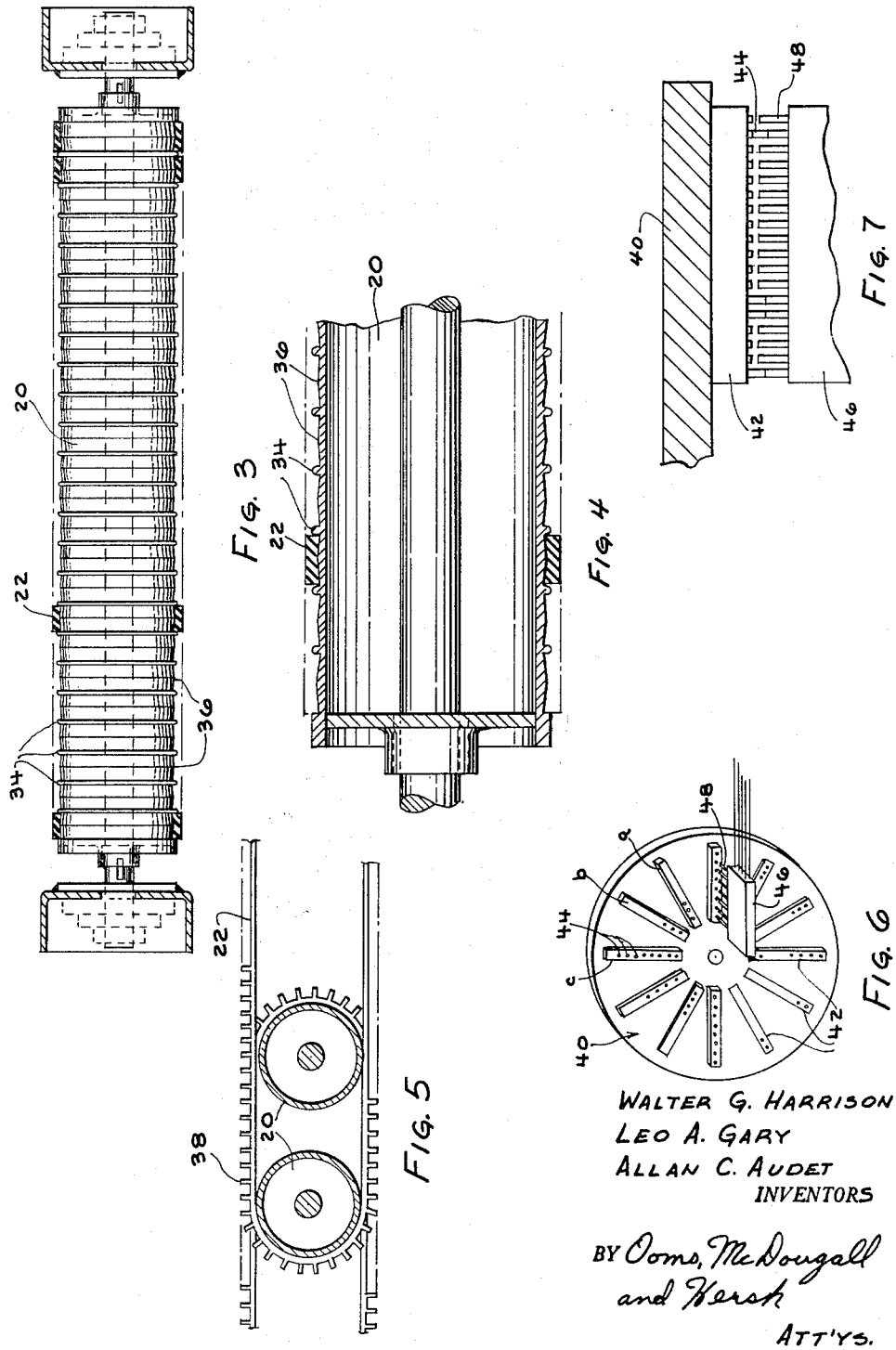

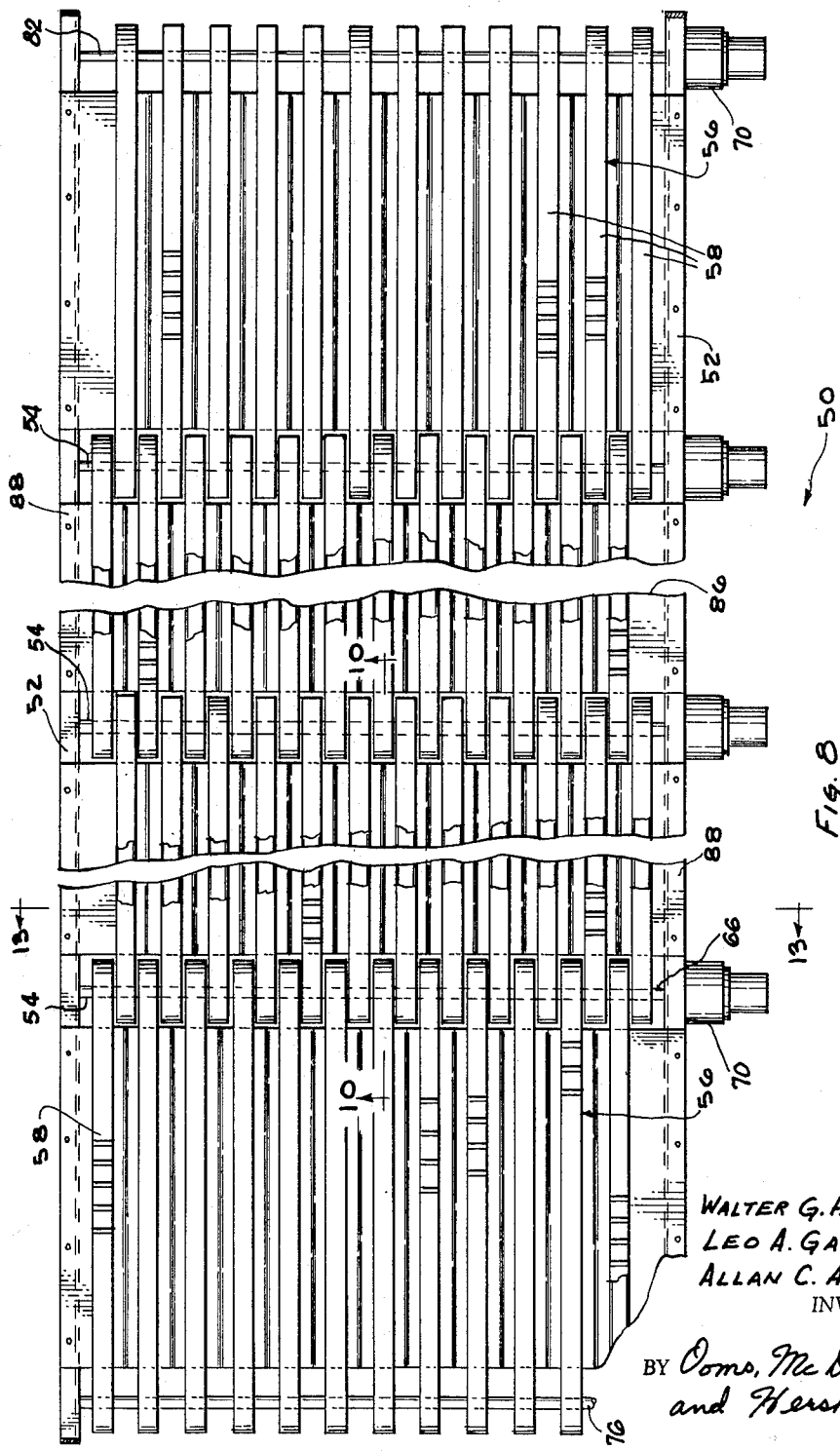

June 8, 1965  W. G. HARRISON ETAL  3,187,878
ARTICLE HANDLING APPARATUS
Filed April 10, 1962  6 Sheets-Sheet 4
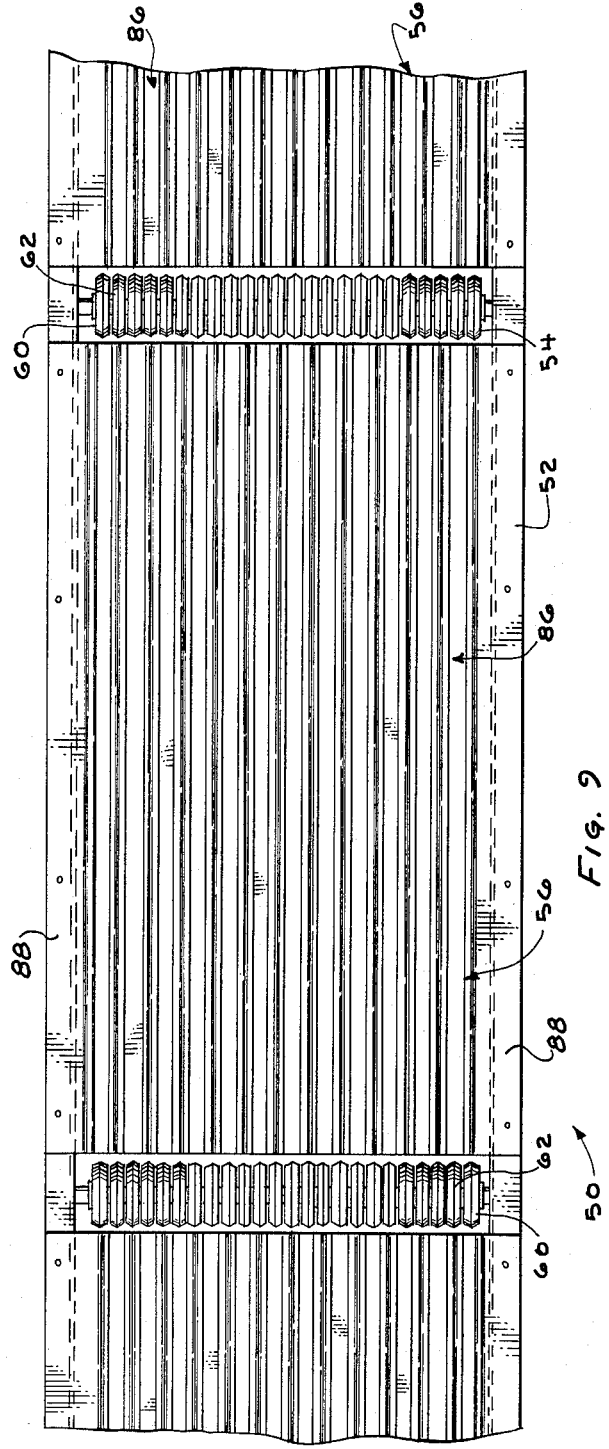
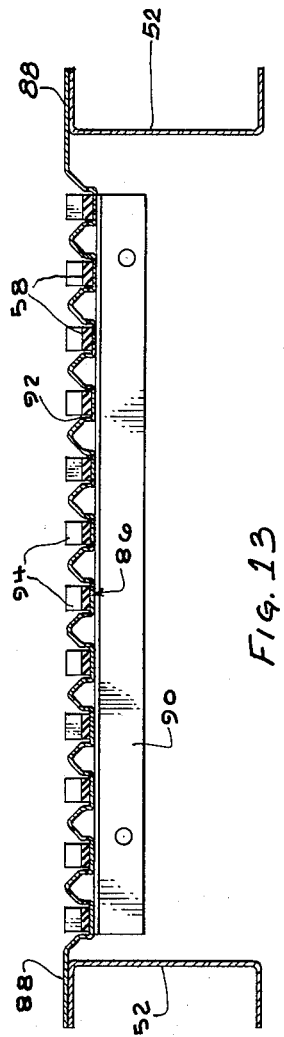
WALTER G. HARRISON
LEO A. GARY
ALLAN C. AUDET
INVENTORS
BY Ooms, McDougall
and Hersh
ATT'YS.

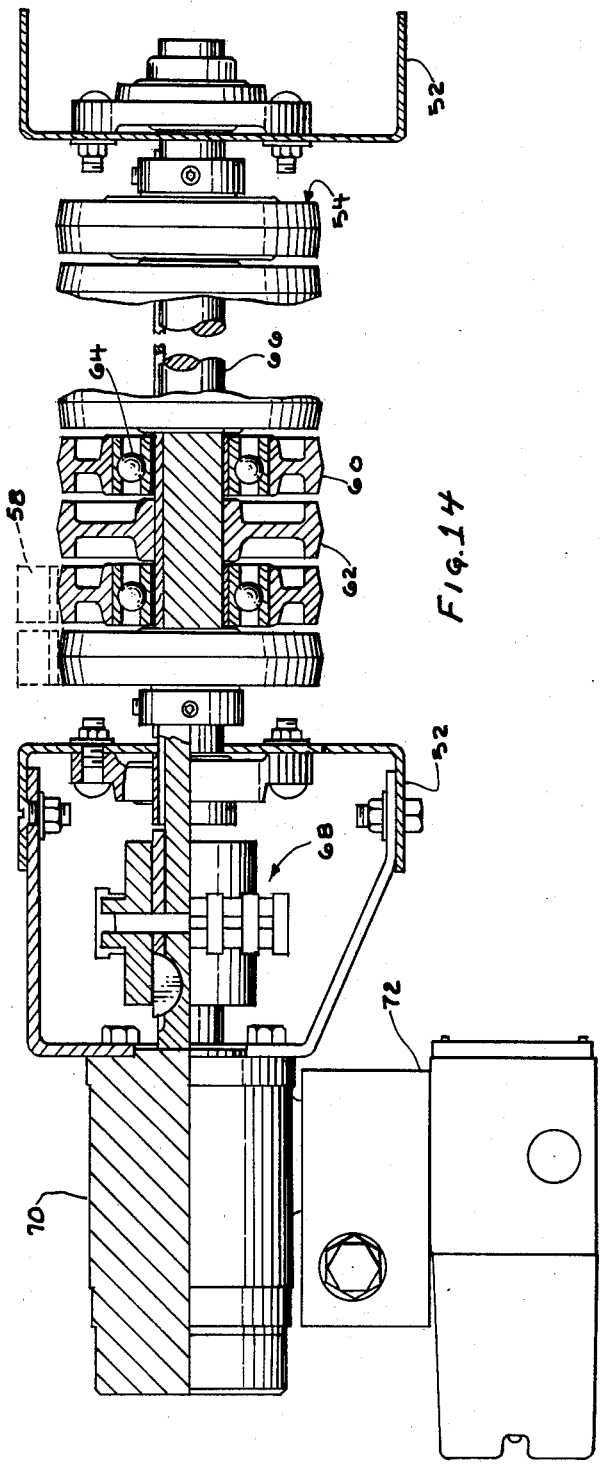
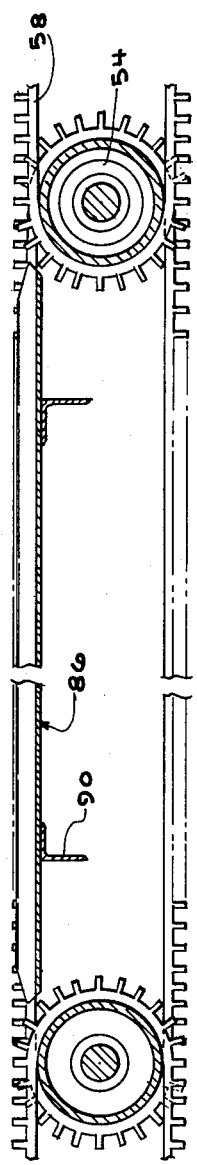
WALTER G. HARRISON
LEO A. GARY
ALLAN C. AUDET
INVENTORS

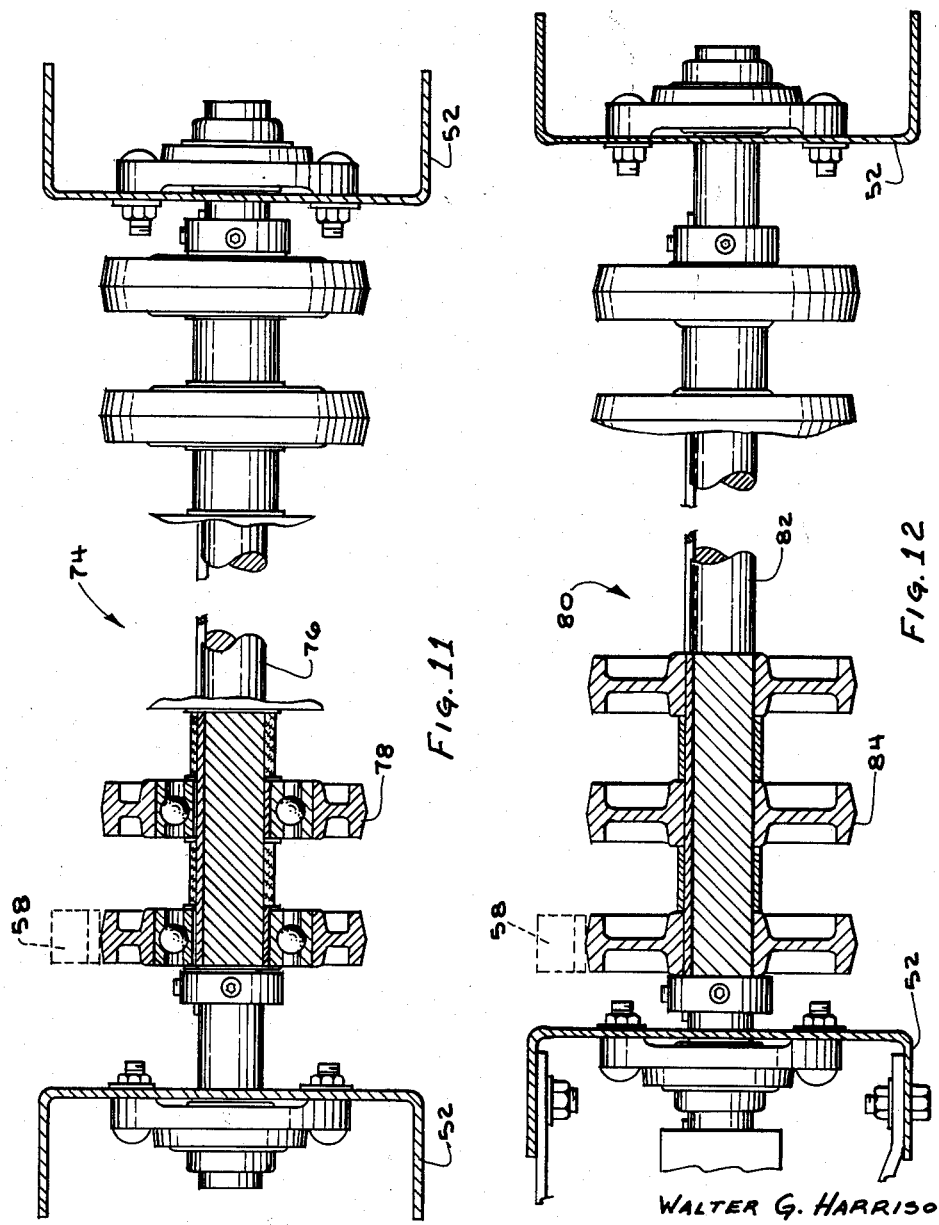

United States Patent Office 3,187,878
Patented June 8, 1965

3,187,878
ARTICLE HANDLING APPARATUS
Walter G. Harrison, Westchester, Leo A. Gary, Chicago, and Allan C. Audet, Arlington Heights, Ill., assignors, by mesne assignments, to Prospect Manufacturing Co., Inc., Chicago, Ill., a corporation of Illinois
Filed Apr. 10, 1962, Ser. No. 186,523
5 Claims. (Cl. 198—37)

This invention relates to an article handling apparatus, and it relates more particularly to an apparatus which is adapted to efficiently handle and deliver a large variety of articles. The apparatus of this invention is particularly characterized by means for accumulating several articles which are to be handled and delivered to certain stations but which are delayed prior to delivery for any one of several reasons.

In a copending application Serial No. 81,754, filed January 10, 1961, and entitled Automatic Sortation System, there is disclosed an apparatus which provides for passing of articles to a conveyor and for subsequent delivery of these articles to any of a plurality of preselected stations. The prior disclosed apparatus, in addition, provides for coding of the articles as they are passed to the conveyor. A memory system is provided in conjunction with the transfer means whereby the articles can be deposited by the conveyor on either side of the conveyor at locations corresponding to the various codes.

Means have been devised for transferring articles to conveyors of the type described in the aforementioned application. For example, transfer means of the type described in an additional copending application Serial No. 139,140, filed September 19, 1961, and entitled Delivery Apparatus, have been found extremely efficient. With transfer means of the type described in the later filed application, articles can be delivered to a conveyor automatically and with great speed. Furthermore, these delivery means are capable of providing for assignment of the above mentioned codes to the articles before they are passed to the conveyor portion of the system which is equipped with the memory device. In accordance with the later filed application, the assigned code can be transferred to the memory device at the same time that the corresponding article is transferred to the conveyor. With this arrangement, articles transferred will be delivered by the conveyor to a desired station.

Systems of the above type are particularly suitable where a heavy and relatively steady flow of articles is presented for handling. Thus, the above described systems operate at greatest efficiency where rapid movement of articles is desired in order that pile-up of articles will not be experienced.

In some applications, of course, a steady flow of articles cannot be expected and, therefore, many installations of the type described would be faced with periods of extremely heavy load which are preceded and followed by relatively little activity. It is not desirable to have the installations in operation during periods of low activity, while at the same time, it has been found preferable to provide means which will avoid slow-downs and pile-ups during peak periods. Some post office operations illustrate the above points. In such operations, there are generally daily periods of peak activity. On the other hand, during certain intervals of every day there may only be occasional package or mail sack deliveries which would not warrant the operation of the entire delivery and conveyor apparatus.

It is an object of this invention to provide an article delivering apparatus which overcomes the above noted difficulties and which is adapted to efficiently handle large varieties of articles.

It is a more specific object of this invention to provide an article handling apparatus which is provided with means for accumulating a plurality of articles whereby the articles can be prepared for transfer to a conveyor mechanism while the conveyor mechanism itself is not in operation.

It is an additional object of this invention to provide an article handling apparatus which is particularly suitable for use in installations which have varying periods of activity over a given period of time whereby packages can be efficiently handled during periods of very low activity and during periods of peak activity.

These and other objects of this invention will appear hereinafter and, for purposes of illustration, but not of limitation, specific embodiments of this invention are shown in the accompanying drawings in which:

FIGURE 1 is a plan view of an article accumulating mechanism for use in accordance with the principles of this invention;

FIGURE 2 is an enlarged fragmentary view of the article accumulator mechanism of FIGURE 1;

FIGURE 3 is an enlarged cross-sectional view of the mechanism of FIGURE 1 illustrating in part a roller and belt structure employed in the accumulating mechanism;

FIGURE 4 is an enlarged fragmentary cross-sectional view of the roller and belt structure;

FIGURE 5 is a cross-sectional view taken through two adjacent rollers illustrating the interrelation of the adjoining belts;

FIGURE 6 is a perspective view of a proposed code transfer mechanism;

FIGURE 7 is a detail illustration of a portion of the mechanism of FIGURE 6;

FIGURE 8 is a plan view of an alternative form of an article accumulator mechanism;

FIGURE 9 is a bottom view of the accumulator mechanism of FIGURE 8 with the belts removed;

FIGURE 10 is a fragmentary sectional view taken about the line 10—10 of FIGURE 8;

FIGURE 11 is a cross-sectional view, partly cut away, of the entry end of the mechanism of FIGURE 8, this end being shown at the left-hand side of FIGURE 8;

FIGURE 12 is a cross-sectional view, partly cut away, of the exit end of the mechanism of FIGURE 8, this end being shown at the right-hand side of FIGURE 8;

FIGURE 13 is a cross-sectional view taken about the line 13—13 of FIGURE 8; and

FIGURE 14 is a cross-sectional view, partly cut away, of an intermediate section of the conveyor mechanism of FIGURE 8.

The present invention relates to an article handling system wherein a plurality of stations are located for receipt of articles which are tranferred onto a conveyor. The conveyor, which may be of the type disclosed in the above mentioned copending applications, is adapted to distribute the articles to the various stations, and transfer means are provided for placing the articles on the conveyor. In accordance with the concepts of this invention, an article accumulator is provided which has a loading end for the articles and a discharge end located adjacent the transfer means. The article accumulator includes a longitudinally extending frame and a plurality of rollers disposed within the frame. In one form of the invention, the rollers are placed in pairs with the rollers in each pair being closely spaced and with the respective pairs being separated by a substantial distance. A plurality of sets of belts are associated with the rollers. The belts in any one of the sets are wrapped around the two rollers in any two adjacent pairs which are farthest apart. The belts in the adjacent sets are adapted to inter-mesh to provide continuity between the sets. Separate drive means for one of the rollers in each of the pairs are provided whereby each of the belt sets can be driven to transport articles on the upper surfaces.

In an alternative form of this invention, single rollers are provided at either end of each set of belts. Each of the single rollers comprises a composite of idlers and driven sections so that belts associated with one set can be placed over idlers while belts in another set can be associated with driven sections of these rollers while intermeshing with the other belts.

Detecting means, such as electric eyes, are associated with each of the belt sets and are operatively connected to each of the driving means. The detecting means are each positioned adjacent a belt set and they are adapted to stop their associated drive means when an article is detected on the belt set.

In accordance with a preferred form of this invention, coding means are associated with the accumulator apparatus whereby each article can be coded as it is placed on the loading end of the accumulator. The coding means is designed whereby the code for the particular article will be transferred with the article to the conveyor structure so that the article can be deposited at a desired location.

As a further refinement of the invention, the belts in the above described sets are formed of molded rubberlike materials and are provided with transverse, upstanding ribs along their lengths in order to more effectively grasp and carry the articles. In addition, the rollers in one form of accumulator can be provided with upstanding, peripheral ridges across their lengths. The ridges are spaced apart a distance equal to the width of the belts so that the belts can be retained in position during operation of the accumulator. As a further means of maintaining the belts in their proper location, the outer diameter of the rollers is adapted to increase gradually between adjacent pairs of the ridges to provide a maximum diameter at the center of each pair of ridges.

The belts in each of the sets making up the accumulator can also be retained in position by suspending supporting pans on the accumulator frame beneath each of the belt sets. Channels provided in the pan prevent riding of the belts out of their designated paths and the pans also serve to support the belts to prevent sagging.

The accompanying drawings illustrate examples of two systems characterized by the features of this invention. In FIGURE 1 there is shown a conveyor system including the trays 10 which operate in the manner set forth in the aforementioned application Serial No. 81,754. Specifically, the trays are adapted to deliver articles carried thereon to any one of several stations along the conveyor path. In accordance with the prior disclosure, a memory system permits assigning of a code upon placement of an article on one of the trays, and the system provides for automatic delivery of the particular articles at a station corresponding to the assigned code.

A transfer belt 12 may be provided for transferring articles onto the conveyor trays 10. This belt may, for example, comprise a two speed belt of the type described in the aforementioned copending application Serial No. 139,140. A belt of this type is adapted to carry an article at low speed until the article moves into the path of an electric eye 14. At this time, the belt stops and remains stationary until an empty tray 10 is in position to receive the article on the belt. A high speed drive means for the belt 12 is then adapted to be operated and the article will be passed to the empty tray. A system of the type described in application Serial No. 139,140 is provided with means whereby the code can be assigned to the article upon entry onto the belt 12 and the code is adapted to be transferred to the conveyor memory timer when the article is passed to the conveyor.

Positioned adjacent the transfer belt 12 there is provided an article accumulator generally designated 16.

The accumulator includes elongated frame members 18 and rollers 20 mounted in parallel relation between the frame members. A single roller 20 is provided at either end of the accumulator, while the remaining rollers are arranged in closely spaced pairs. A plurality of belts 22 are mounted to pass around the rollers 20 as illustrated in FIGURE 2. It will be noted that the belts are arranged in several sets, each belt in a given set passing around the same two rollers 20. The belts in a given set are provided to pass around the rollers which are farthest apart in any two adjacent pairs. With this arrangement of the belts, and because the belts in adjacent sets are alternately spaced, there is an inter-meshing of the adjacent belt sets. Thus, the upper reach of one set of belts is overlapping with respect to the upper reach of an adjacent set.

A motor 24 is adapted to drive the right hand roller in each of the pairs of rollers 20, and a motor 25 is provided for the individual roller at the exit end of the accumulator. The belts 22 are tensioned over their associated rollers whereby they can be driven by frictional contact with the motor operated roller.

Electric eyes 26 include means for projecting a beam over the upper surface of the conveyor and means on the opposite side for detecting the beam. The electric eye or similar detecting means are each connected to one motor 24. The motor connected to the detecting means 26 is adapted to be stopped when the beam projected is interrupted by an article on the conveyor. The motors are adapted to run continuously as long as the beam remains uninterrupted.

In the structure shown in FIGURE 2, the motors 24a, 24b and 24c are adapted to move the upper surface of the belt sets from left to right. Detecting means 26a, 26b and 26c are associated with the motors 24a, 24b and 24c, respectively, whereby an article on a given belt set when in the path of an electric eye will cause stopping of that belt set. For example, the article 28 is shown in a position interrupting the beam of the detecting means 26b. Accordingly, the motor 24b cannot rotate and the belt set associated therewith will be stationary. The position of article 30 across the beam of detecting means 26c prevents operation of the motor 24c and, therefore, the belt set associated with this motor will not be rotating. It must be noted here that as soon as the article 30 moves out of the path of the beam of detecting means 26c, the belt set associated with motor 24c will begin to rotate. Due to the overlapping of the belt sets, the article 28 will then be moved to the right, since it will be gripped by this belt set. It will, therefore, be apparent that the movement of a given article across the entire length of the accumulator 16 depends upon the presence or absence of articles preceding this given article.

Again referring to FIGURE 1, an electric eye 14 is provided to control the low speed operation of the belt 12, and an electric eye 32 at the extreme right of the accumulator 16 controls the motor 25. The belt 12 in the embodiment shown will operate at low speed and pick up an article from the right hand belt set on the accumulator 16 when the beam of the detecting means 14 is not interrupted.

FIGURES 3 through 5 illustrate in detail one type of roller and belt structure employed in the practice of this invention. The rollers 20 are provided with upstanding ridges 34 which are spaced apart a distance equal to the width of belts 22 whereby the belts can be confined to a desired location on the rollers. In addition, raised portions 36 are provided on the rollers 20 at points centrally of adjacent ridges 34. The raised portions 36 comprise crowns which may be formed by gradually machining the rollers to the configuration illustrated. These crowns further aid in maintaining the location of the belts with respect to the rollers 20. Specifically, when the belts are tensioned, there is a tendency for the belts to locate centrally with respect to the crowns in the rollers.

The belts 22 are preferably formed of a molded rubber-like material. The belts are also preferably provided with transverse, upstanding ribs which extend along their entire length in order to provide a better gripping surface and to improve frictional engagement with respect to articles on the accumulator. Such a design is particularly advantageous when handling packages having smooth surfaces or other characteristics which make them difficult to grip.

In the operation of the accumulator mechanism, packages are placed at the loading end of the accumulator and eventually are transferred to the conveyor trays 10. If the accumulator is empty, each of the motors 24 and the motor 25 will be operating and a package placed on the left hand belt set will proceed immediately to the transfer belt 12. This package will then be placed on the conveyor 10 when an empty tray is in position. If a package is already on the transfer belt 12, this belt will be stationary and a second package will not be able to pass onto the belt 12 and will, therefore, be stopped across the beam of detecting means 32. Accordingly, motor 25 will stop. A third package placed on the accumulator will then stop across the beam of the right hand detecting means 26 stopping the next motor 24. Obviously, as long as these first packages remain in position, additional packages placed on the accumulator will line up adjacent succeeding detecting means until each of the belt sets is stopped and the accumulator is full.

As previously indicated, the accumulator mechanism of this invention is particularly valuable for certain applications where it is not desired to run the conveyor system continuously. In such an operation, the conveyor 10 will be shut down and the transfer belt 12 will not transfer any packages to the conveyor. Therefore, as above described, the accumulator mechanism will store packages until it is full. With stored packages on the accumulator, the conveyor can be started at any time and the mechanism will then automatically deposit packages on the conveyor. Thus, the first package which was resting on the transfer belt 12 will be passed by the high speed operation of this belt to the conveyor, once it begins operation. This high speed operation, as well as the subsequent low speed movement of belt 12, will draw the next package from the right hand belt set of the accumulator. As soon as this package is moved onto the belt 12, the beam of detecting means 32 will no longer be interrupted and motor 25 will become operative. Accordingly, the package at rest on the second belt set will be drawn by the rotating first belt set toward the transfer belt 12. With this operation, the beam of the right hand detecting means 26 will be uninterrupted and the second belt set will begin rotating, thus moving the next package to the right. Obviously, the whole accumulator can be cleared in this manner.

FIGURES 8 through 14 illustrate an alternative form for the structure of the belt sets in the accumulator mechanism. The structure shown in these figures is adapted to be used with a conveyor 10 and transfer belt 12 in the same manner as described with reference to the accumulator 16. Similarly, detecting means of the type shown at 14, 26 and 32 will serve to operate the drive motors for these belts in substantially identical fashion.

The accumulator 50 shown includes frame members 52 having a plurality of drive rollers 54 suspended between them. One of the rollers 54 is placed at either end of each of the belt sets 56 which make up the accumulator. Belts 58 are tensioned around the respective portions of the rollers 54 and as shown in FIGURES 8 and 10, the belts inter-mesh and also overlap in the manner described with reference to the accumulator mechanism 16.

As best shown in FIGURE 14, the drive rollers 54 are made up of alternate idlers 60 and driven portions 62. The idlers are mounted over bearings 64 and are free to rotate with respect to shaft 66 while the portions 62 are keyed to this shaft.

One end of the shaft 66 is journalled for rotation in a frame member 52. The other end of the shaft is connected by means of a flexible coupling arrangement 68 to a drive motor 70. A motor actuating solenoid is adapted to be included in the housing 72 whereby the motor 70 will operate in response to the solenoid condition. The solenoid condition, in turn, will depend on the detecting means associated with each of the belt sets of the accumulator. As previously noted, the presence or absence of an article on the accumulator will govern the operation of the motor. It will be appreciated that the driving system shown is provided only for purposes of illustration and other driving arrangements suitable for operating the rollers 54 in the manner described can be employed.

FIGURES 11 and 12 illustrate the roller assemblies located, respectively, at the entry and exit ends of the accumulator 50. The assembly 74 of FIGURE 11 comprises a shaft 76 journalled at either end in the frame members 52. The shaft is provided only with idlers 78 since driven roller portions are not needed at the entry end.

The assembly 80 of FIGURE 12 includes a shaft 82 provided only with driven roller portions 84 keyed thereto. A motor assembly of the type described drives the shaft 82 so that the belt set at the exit end can be driven to deliver articles from the accumulator to the transfer belt.

A support pan 86 is shown in combination with each of the belt sets in the accumulator 50. The pan 86 is provided with flanges 88 which permit securement with the frame members 52. Beams 90 are provided on the underside of the pan for reinforcing purposes.

The belts 58 are adapted to ride in channels 92 formed in the pan. The lugs 94 of the belts extend above the top of the channel sides to provide for gripping of articles carried on the accumulator. The arrangement of the channel sides prevents passage of small articles between the belts, and these articles can be carried with the same reliability as larger articles. Furthermore, the pan 86 prevents any sagging of the belts irrespective of the weight of the articles carried.

The pan 86 has been shown in combination with the accumulator 50, however, use in combination with the accumulator 16 is also contemplated.

The operation of the accumulator 50 is substantially the same as the operation of the accumulator 16. Thus, detecting means are adapted to be associated with each belt set 56 so that the motors will operate to advance articles only if clear belt sets are available. The motor 70 associated with the belt set at the end of the conveyor will pass articles to succeeding belt sets as long as these sets are empty. Since each intermediate roller has both idler and driven portions, a belt set can rotate even though its adjacent set is stationary. Therefore, transfer of articles will not occur until this adjacent set is clear and the driven rollers associated therewith become operative.

Where more or less erratic loads are experienced in an installation handling various articles, the provision of an accumulator will permit loading of the conveyor in an efficient manner. Where only a few articles straggle in at long intervals, the conveyor 10 can be shut down for the whole time while the accumulator builds up gradually. When the accumulator is filled, or when the pace of articles begins to increase, the conveyor 10 can be made operative, all articles on the accumulator will be passed to the conveyor, and all new articles can be rapidly delivered to the conveyor. The accumulator mechanism further avoids delays, since articles can be placed on the accumulator at a rate faster than the conveyor can receive them. At times of peak load this will be an advantageous arrangement.

As previously indicated, it is desirable to provide means for coding of the articles as soon as they are placed on the accumulator and to provide means for transferring this code with the articles through their various stages of handling. An example of a possible coding mechanism is shown in FIGURES 6 and 7. The device shown is similar to the device illustrated in copending application Serial No. 131,358, filed August 14, 1961, now Patent No. 3,151,731, and entitled Article Transfer Apparatus. An arrangement of this type comprises a rotary wheel 40 having disposed thereon a plurality of housings 42. Switch actuating means 44 are positioned to protrude from the housings in accordance with the operation of a coding mechanism. The wheel 40 in accordance with this invention can be provided to index one step each time the last belt set discharges an article onto the transfer belt 12. As in application Serial No. 131,358, the means 44 which are protruding from the housing 42 are adapted to actuate switches in accordance with the particular code assigned to the article being passed to the transfer belt. A switch housing 46 is provided for cooperation with the means 44 in order to accomplish this. The housing has extending therefrom flaps 48 which are each connected to a switch. Depending on which of the means 44 are extending, particular flaps 48 will be engaged and their associated switches actuated whereby a code can be transferred. The switches in the housing 46 are to be integrated with a circuit of the type described in Serial No. 131,358.

The means 44 which are caused to protrude for actuating switches are operated by solenoid actuated means as in application Serial No. 131,358, now Patent No. 3,151,-731. The solenoid actuated means, which in this case are associated with each of the housings 42, are adapted to be actuated by an operator at a console positioned at the loading end of the accumulator. The arrangement is such that the solenoids which are energized will be associated with a housing corresponding to the first empty belt set. Thus, if the first two belt sets on the accumulator are occupied, the first two housings 42 (housings *a* and *b*, FIGURE 6) will already have protruding members 42 corresponding to the desired code. Therefore, the code for the next article will be passed to housing *c* whereby the extending members 44 in this housing will hit the flaps 48 when the wheel 40 has indexed three times. Thus, the code for the third package will be transferred at the same time as the package is passed to the transfer belt.

If the accumulator is empty when a package is placed thereon, the coding mechanism is adapted to transmit the code directly to means associated with switches in the housing 46, bypassing the wheel 40. With the accumulator empty, this package will pass directly to the belt 12, and with this coding arrangement the code for the package will likewise pass directly to the belt 12.

It will be obvious that various changes can be made in the arrangements shown. Thus, several accumulators can be employed in combination with one or more transfer means. There is obviously no particular limit on the length of an accumulator and, in addition, transfer means other than the two speed belt 12 can be employed. For example, the drum type mechanism described in Serial No. 131,358, now Patent No. 3,151,731, can obviously be integrated with the accumulator mechanism of this invention. Furthermore, the accumulator mechanism can be adapted to pass articles directly to a conveyor and, in this connection, the invention is not limited to the use of a conveyor comprising trays as shown.

In the coding arrangement shown, a preferred system includes the provision of eighteen separate switches corresponding to the units digits 1 through 9 and the tens digits 10 through 90. With this arrangement, ninety-nine possible coding combinations are available. However, it will be apparent that other combinations can readily be employed. In this connection, it is emphasized that the invention is not limited to the provision of any particular coding mechanism and various devices other than the rotating wheel described are contemplated. Furthermore, the accumulator mechanism obviously has utility apart from any coding operation. Similarly, the coding can be undertaken at any stage, for example, at the end of the accumulator prior to passage to the conveyor.

It will be understood that various other modifications may be made in the above described apparatus which provide the characteristics of this invention without departing from the spirit thereof, particularly as defined in the following claims.

We claim:

1. An article accumulator having a loading end and a discharge end, said accumulator including longitudinally extending frame means, a plurality of roller assemblies disposed within said frame means with their respective axes parallel, said assemblies being longitudinally spaced apart and comprising an idler portion and a driven portion, a plurality of sets of belts fitted over said assemblies, the belts in any one of said sets being wrapped around an idler portion in one assembly and a driven portion in an immediately adjacent assembly, separate drive means for each of said assemblies adapted to rotate said belt sets, and means operatively connected to said drive means for detecting the presence of articles on said belts, said detecting means being adapted to stop their associated drive means when said articles are detected, and wherein said assemblies each comprise a single shaft, said drive means being operatively associated with the shaft of each assembly, driven portions on each shaft for carrying individual belts in one belt set and idlers interposed between said driven portions in alternating fashion for carrying an adjacent belt set whereby operation of the drive means for a given assembly will move the belt set carried by said driven portion without moving the adjacent belt set carried by said idlers.

2. An article accumulator according to claim 1 including a plurality of supporting pans secured to said frame and extending between said assemblies beneath said belt sets, said pans including longitudinal channels for confining individual belts in each of said sets, and means connecting said channels closing off the space between individual belts.

3. In a delivery system wherein a plurality of stations are located for receipt of articles and transfer means are provided for distributing articles to said stations, the improvement comprising an article accumulator having a loading end for said articles and a discharge end located adjacent said transfer means, said accumulator including longitudinally extending frame means, a plurality of roller assemblies positioned within said frame with their respective axes parallel, said assemblies being longitudinally spaced apart and each assembly comprising a single shaft, driven portions on said shaft, idlers interposed between said driven portions in alternating fashion, a plurality of sets of belts fitted over said assemblies, the belts in any one of the sets being wrapped around the driven portion of one of said assemblies and the idlers of an immediately adjacent assembly, the belts in adjacent sets thereby inter-meshing to provide continuity between the sets, separate drive means for each of the assemblies whereby the sets of belts associated with driven portions which are operated by said drive means are adapted to transport said articles, detecting means associated with each of said belt sets and operatively connected to said drive means, each of said detecting means being positioned adjacent the end of its associated belt set which is nearest to said discharge end and said detecting means being adapted to stop the drive means for its associated belt set when an article moves to said end of the belt set.

4. A delivery system in accordance with claim 3 wherein the roller assembly at the loading end of said accumulator opposite said transfer means includes only driven portions and wherein the roller assembly at the discharge end of said accumulator adjacent said transfer means includes only said idlers.

5. A delivery system in accordance with claim 3 wherein the ends of said belt sets nearest said discharge end are disposed on the driven portions of each assembly.

References Cited by the Examiner

UNITED STATES PATENTS

| | | | |
|---|---|---|---|
| 1,199,818 | 10/16 | Peck. | |
| 1,431,488 | 10/22 | Reed | 198—90 X |
| 2,227,778 | 1/41 | Fischbach et al. | |
| 2,308,872 | 1/43 | Foster | 198—184 |
| 2,590,091 | 3/52 | Devol. | |
| 2,662,633 | 12/53 | Kingsley | 198—37 X |
| 2,978,092 | 4/61 | Phillips et al. | 198—78 X |
| 2,985,835 | 5/61 | Stuart | 198—78 X |
| 3,066,788 | 12/62 | Christiansen | 198—37 X |
| 3,116,823 | 1/64 | Schneider | 198—160 |

FOREIGN PATENTS 1,214,778  11/59  France.

SAMUEL F. COLEMAN, *Primary Examiner.*

JULIUS E. WEST, WILLIAM B. LA BORDE,
*Examiners.*